United States Patent [19]

Geringer

[11] Patent Number: 5,160,245
[45] Date of Patent: Nov. 3, 1992

[54] DISPLACEMENT CONTROL FEEDBACK APPARATUS AND METHOD

[75] Inventor: Kerry Geringer, Ames, Iowa
[73] Assignee: Sauer, Inc., Ames, Iowa
[21] Appl. No.: 694,345
[22] Filed: May 1, 1991
[51] Int. Cl.[5] .................. F04B 49/00; F16D 31/02
[52] U.S. Cl. ........................ 417/218; 60/445; 91/506
[58] Field of Search .............. 60/444, 443, 445, 452, 60/487; 417/218

[56] References Cited

U.S. PATENT DOCUMENTS

| | | | |
|---|---|---|---|
| 2,945,449 | 7/1960 | LeFebvre et al. | 91/506 |
| 3,450,054 | 6/1969 | Halwas et al. | 60/452 X |
| 3,669,570 | 6/1972 | Himmler | 91/506 X |
| 3,685,290 | 8/1972 | Krusche | 60/452 |
| 3,804,554 | 4/1974 | Jones | 91/506 X |
| 4,041,702 | 8/1977 | Habiger | 60/445 X |
| 4,381,702 | 5/1983 | Myers | 91/506 |
| 4,476,680 | 10/1984 | Pollman et al. | 60/452 X |
| 4,528,813 | 7/1985 | Izumi et al. | 60/444 X |
| 4,559,778 | 12/1985 | Krusche | 60/452 X |
| 4,561,250 | 12/1985 | Aoyagi et al. | 60/444 X |
| 4,599,050 | 7/1986 | Ishizaki et al. | 417/216 |
| 4,613,286 | 9/1986 | Ishikawa | 60/452 X |
| 4,756,156 | 7/1988 | Appel | 60/444 X |

FOREIGN PATENT DOCUMENTS

| | | |
|---|---|---|
| 2312911 | 10/1973 | Fed. Rep. of Germany . |
| 2513548 | 10/1976 | Fed. Rep. of Germany . |
| 2656790 | 6/1978 | Fed. Rep. of Germany ........ 91/506 |
| 3711037 | 4/1987 | Fed. Rep. of Germany . |
| 0184748 | 11/1982 | Japan ...................... 60/444 |

Primary Examiner—Edward K. Look
Assistant Examiner—John Ryznic
Attorney, Agent, or Firm—Zarley McKee, Thomte, Voorhees & Sease

[57] ABSTRACT

A feedback apparatus according to the present invention elastically interconnects the swashplate of a variable displacement hydraulic unit with the valve spool of a hydraulic unit displacement control, and is constructed such that a predetermined spring preload force is developed. A feedback spring extends along the valve spool and is surrounded by an elongated housing coupled with the swashplate. Axially movable spring guides are interposed between opposite ends of the spring and a flange formed at each end of the housing. A suitable spacer is positioned between the spring and at least one of the spring guides to compress the spring to a length representative of the desired preload.

6 Claims, 2 Drawing Sheets

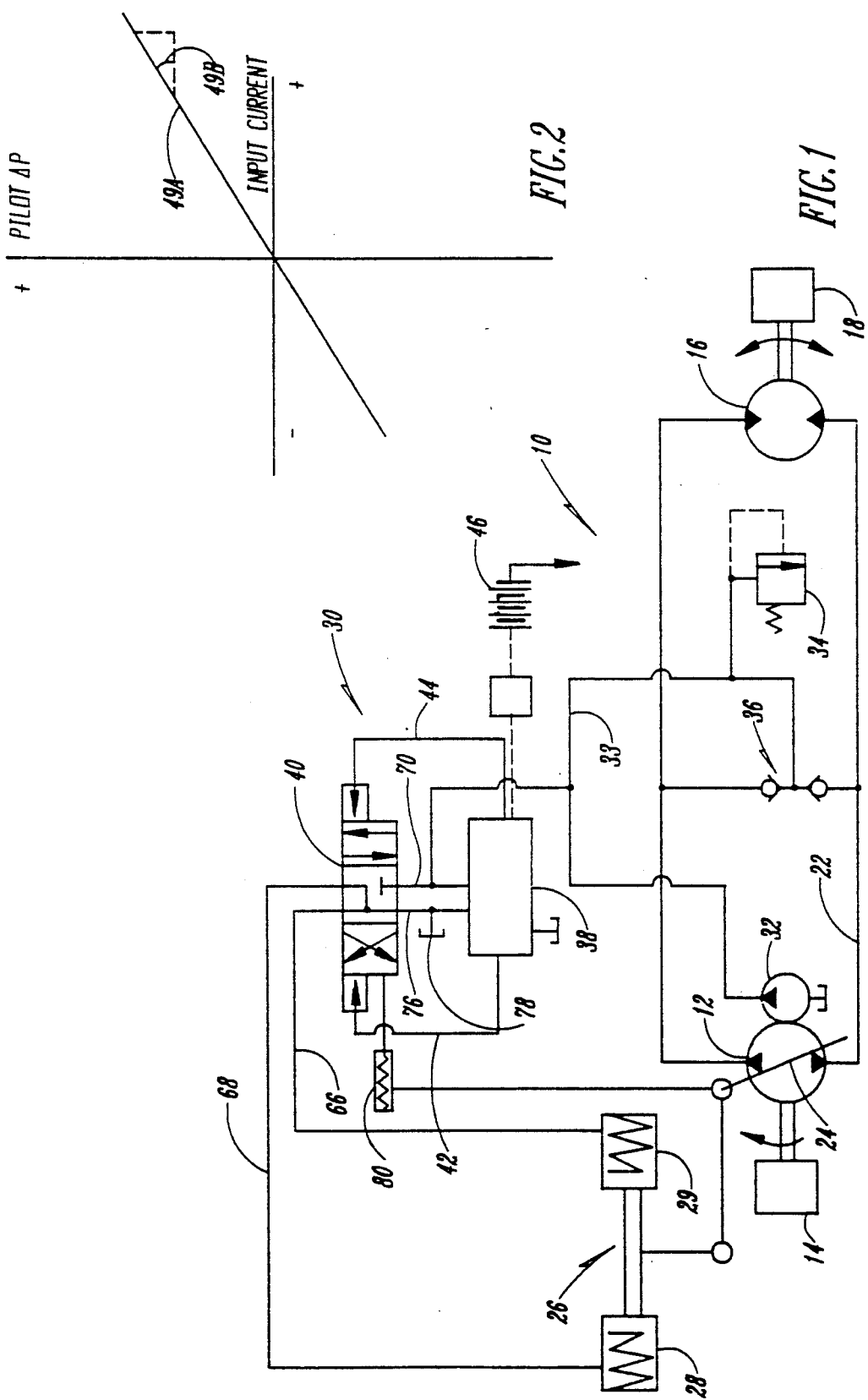

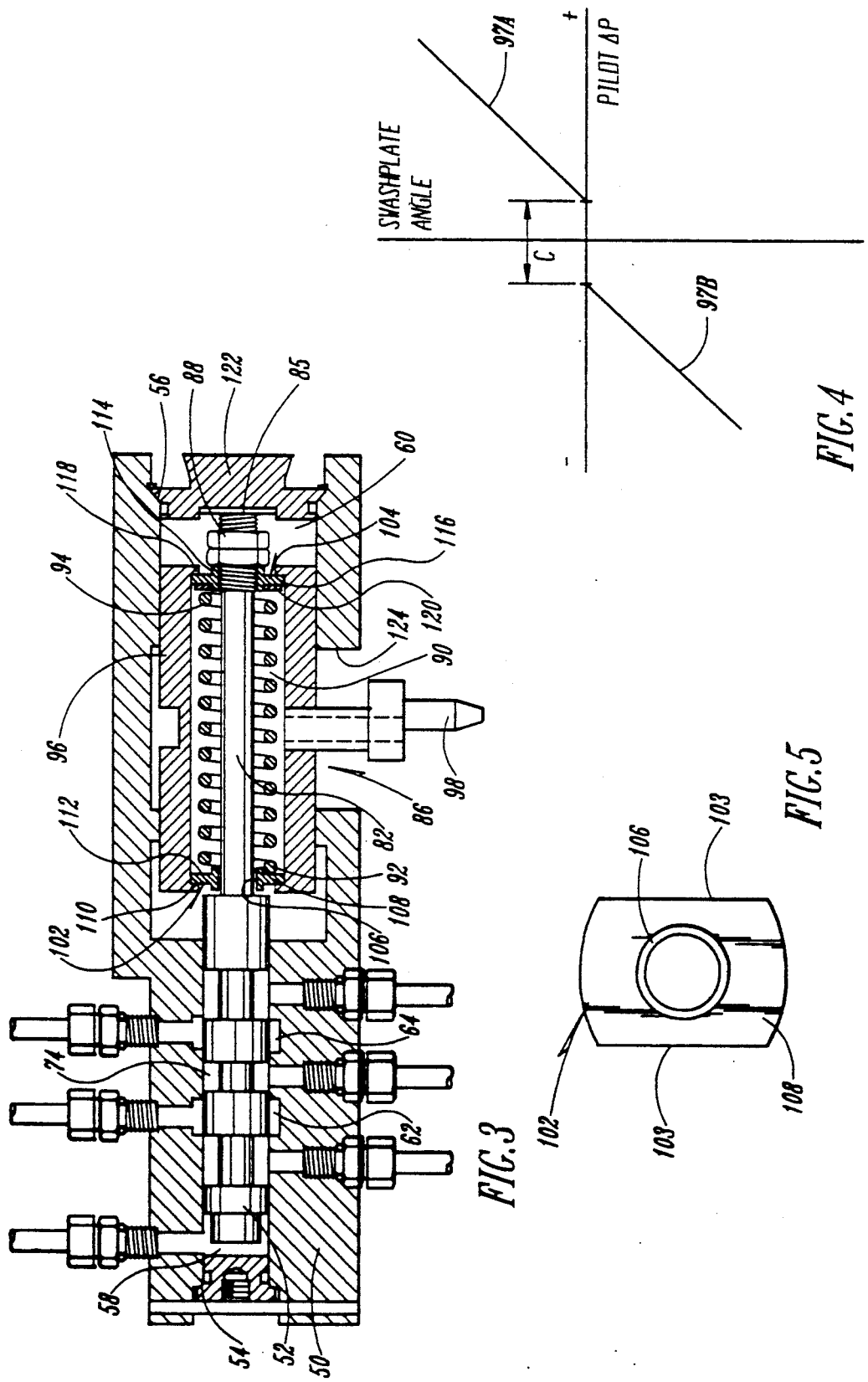

DISPLACEMENT CONTROL FEEDBACK APPARATUS AND METHOD

TECHNICAL FIELD

This invention generally relates to a displacement control for use in a hydrostatic transmission and, more specifically, to a feedback apparatus in a displacement control for coupling a positionable swashplate on a variable displacement hydraulic unit with the displacement control.

BACKGROUND ART

Hydrostatic transmissions are commonly used to transmit drive torque in a motor vehicle and include a variable displacement hydraulic pump driven by an input shaft. A hydraulic fluid is pumped from the hydraulic pump to a fixed displacement hydraulic motor for driving an output shaft. In these devices, there is no mechanical linkage between the input shaft which drives the hydraulic pump and the output shaft which is driven by the hydraulic motor.

Many hydraulic pumps of the variable displacement type have a rotating cylinder block with pistons axially movable therein. The displacement of the hydraulic pump is proportional to the stroke of the pistons within the cylinder block. Where the hydraulic pump is of the axial piston type, the pistons engage a tiltable swashplate to vary the stroke of the pistons. When the swashplate is perpendicular to the axis of the cylinder block, the swashplate is in a neutral or a zero displacement position and the hydraulic pump has no output. When the swashplate is tilted to a position away from the neutral position, hydraulic fluid is pumped to the motor and power thereby is transmitted from the input shaft to the output shaft.

In order to selectively prescribe the position of the swashplate, a displacement control commonly is provided in communication with a source of pressurized fluid for directing fluid to a servo mechanism which, in turn, adjusts the swashplate position. Displacement controls take many forms, but in most cases they allow an operator to manually select a desired swashplate position and the corresponding hydraulic pump displacement.

A conventional displacement control includes a fluid metering valve having an internal spool which is axially movable in response to a command input. The command input shifts the valve spool, as by a fluid pressure applied to opposite ends of the spool, whereby the valve ports fluid to an appropriate servo mechanism for positioning the swashplate. In order to close the servo control loop between the metering valve and the swashplate, a feedback device, such as a mechanical linkage, interconnects the swashplate with the valve spool. The feedback device is operative to convert the relative displacement of the swashplate and valve spool to a feedback force which opposes the differential pressure acting on the spool. When the feedback force increases to the point where the pressure differential effectively is balanced, the valve spool remains stationary and the swashplate achieves a steady-state operating position.

An elastic spring typically is used in the feedback linkage to convert the relative displacement of the swashplate and the valve spool into a force quantity. Based on the stiffness and initial compression of the spring, a preload force is developed in the spring which opposes the differential command pressure. The valve spool is not displaced until the pressure differential exceeds the spring preload. The range of differential pressure over which the valve spool is nonresponsive is referred to as the deadband operating range for the feedback device.

The limiting case, in which the feedback spring hypothetically has an infinite preload, can be analogized to the case where no spring is provided at all, that is, with the valve spool rigidly linked directly to the swashplate. In this situation, there is no value of differential pressure capable of displacing the valve spool so that the swashplate remains fixed. Conversely, an insufficiently preloaded spring results in a dynamically unstable situation in which small deviations in differential command pressure can undesirably drive the swashplate to full angle. The spring preload, as established by the spring stiffness and spring compression, thus play a significant role in defining the response characteristics of the feedback apparatus and the hydrostatic transmission.

Present spring feedback devices in the displacement controls of hydrostatic transmissions fail to provide the capability of simply prescribing a desired spring preload in an inexpensive and reliable manner. The present invention is directed toward overcoming the problems set forth above in a novel and useful way.

SUMMARY OF THE INVENTION

An object of this invention, therefore, is to provide an improved feedback apparatus in the displacement control of a hydrostatic transmission. Particularly, the feedback apparatus embodies a simple feedback spring assembly which facilitates the selection of preferred response characteristics of the displacement control.

In the exemplary embodiment of the invention, a feedback spring assembly is provided for use in the displacement control of a hydrostatic transmission. The transmission includes a power input shaft driving the input shaft of a variable displacement pump. A fixed displacement motor is connected in closed circuit to the variable displacement pump and has a motor output shaft. The variable displacement pump and the fixed displacement motor together define a hydraulic drive unit for transmitting vehicle drive torque between the power input shaft and the motor output shaft.

In order to vary the displacement of the pump, a tiltable swashplate cooperates with a number of pistons to pump hydraulic fluid to the motor and thereby transmit power from the input shaft to the output shaft. The position of the swashplate is established by the displacement control which directs pressurized control fluid to a servo assembly for modulating the swashplate. The displacement control includes a valve with a fluid metering spool. A feedback apparatus according to the present invention interconnects the swashplate with the valve spool and has a spring extending along the spool surrounded by an elongated housing. The housing is coupled with the swashplate and has a pair of inwardly extending flanges at each end thereof. Spring guides are slidably mounted on the valve spool and seat opposite ends of the spring.

Each spring guide has a cylindrical sleeve coaxial with the valve spool with an outwardly extending collar formed on the periphery of the sleeve. The collar on each spring guide is sandwiched between the corresponding spring end and an in-turned flange at each end of the housing. The spring guides are oppositely biased by the spring and are urged into contact with stops formed on the valve spool. A spring preload is established by the compression of the spring from an original static length to a deflected length, in the housing, prescribed by the distance between the opposite housing flanges. If it is desired to vary the magnitude of the preload, removable inserts, such as shims, are installed between the spring guides and the spring.

This invention also envisions a method of assembling the feedback apparatus in such a way that a preferred preload is achieved in the feedback spring. Initially, with the feedback apparatus outside the valve, the spring guides are mounted on opposite ends of the spring and the assembly is held in an upright orientation. A fixed load corresponding to the desired spring preload is applied to the upper spring guide to compress the spring, and the distance between the collars of the opposite spring guides is measured. The fixed load then is removed and the feedback assembly is mounted on the valve spool in the manner described immediately below.

First, one spring guide is placed within the housing against one of the end flanges. The spring is then placed within the housing, with one end of the spring seating in the previously installed spring guide. A plurality of shims having an aggregate known thickness are then forced against the free end of the spring to compress the spring within the housing. The thickness of the shims is preselected to provide the desired spring preload force when the feedback apparatus is completely assembled, and is equal to the difference between the measured preloaded spring "height" and the known distance between the inturned flanges at each end of the housing.

The second spring guide is then positioned inside the housing and biased against the opposite end flange to maintain the spring in a compressed state. Because the shims were selected to compensate for the difference between the length of the housing and the measured height of the spring when preloaded to a desired value, the installed spring is appropriately compressed and has a preload equivalent to the originally applied fixed load.

A threaded end of the valve spool is then inserted through the opposite spring guides and the housing until the innermost spring guide abuts a shoulder formed on the valve spool. Retaining lock nuts are threaded onto the valve spool and tightened to make contact with the outermost spring guide and secure the feedback apparatus on the valve spool. The valve spool is then inserted through an open of the valve body and the valve body is plugged.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a hydraulic circuit diagram of a hydrostatic transmission utilizing a feedback apparatus according to the present invention;

FIG. 2 is a graph showing the relationship between the input current and the differential pressure output of a displacement control first stage device;

FIG. 3 is a longitudinal sectional view of a second stage device in a displacement control having a feedback apparatus according to the present invention; and FIG. 4 is a graph showing the relationship between the differential pressure output of the displacement control first stage device and the swashplate angle and FIG. 5 is an enlarged scale front elevational view of one of the spring guides.

DETAILED DESCRIPTION OF THE INVENTION

A feedback apparatus according to the invention is designed for use in the displacement control of a hydrostatic transmission, such as shown in FIG. 1 and generally designated 10. Transmission 10 consists of a pump 12 driven by a prime mover 14 and a motor 16 driving a load 18. The pump and the motor are interconnected by a pair of hydraulic lines 20 and 22 to form a closed loop. Pump 12 is of the reversible variable displacement type as diagrammatically shown to include a swashplate 24 operated by a spring centered servo 26 including a pair of piston/cylinder arrangements 28 and 29. The position of the swashplate determines the amount and direction of flow from pump 12 to motor 16 so as to provide a reversible drive of load 18. While motor 16 is shown to have a fixed displacement, it also could be a variable displacement hydraulic unit in staged control relationship with pump 12 so that the motor goes from maximum displacement to minimum displacement after the pump has reached maximum displacement in either direction. A displacement control, generally designated 30, is interconnected between the main loop and the servo mechanism to provide control fluid for positioning the swashplate. Such variable displacement hydrostatic transmissions utilizing various types of hydraulic units are well known and need not be described in greater detail relative to understanding the concepts of the present invention.

As also is quite typical in hydrostatic transmissions a fixed displacement charge pump 32 is used to provide both a source of control fluid and make-up fluid for the main loop. Flow from the charge pump travels through a line 33 to a charge relief valve 34 and a pair of check valves 36. Thus charge pump 32 provides make-up fluid to either of main loop lines 20 or 22, depending on which side is the low pressure side of the loop, as is well known in the art.

Displacement control 30 is an electro-mechanical control and includes a first stage device 38 and a second stage device 40 connected in a serial arrangement for metering control fluid from charge pump 32 to servo mechanism 26 to achieve a desired position of swashplate 24.

First stage device 38 is a pressure control pilot valve in fluid communication with opposite ends of second stage device 40 by means of lines 42 and 44. An electrical command signal is supplied to the pilot valve from power source 46 as regulated by a user control 48, with the magnitude of the electrical current supplied to the pilot valve producing a differential pressure dP in lines 42 and 44 and acting against the opposite ends of second stage device 40.

As illustrated in FIG. 2, pilot valve 38 has linear response characteristics, with any change in the input current resulting in a linearly proportional change in the differential pressure dP. The slope of the line 49a plotted in FIG. 2 is representative of the sensitivity of the pilot valve to fluctuations in input current, with larger angles of inclination 49b corresponding to greater changes in differential pressure dP for a given change in input current.

Second stage device 40 is a fluid metering valve and also is shown in FIG. 3 as having a valve body 50 with an elongated valve spool 52 axially movable therein between opposite plugged ends 54 and 56 of the valve. Valve spool 52 is shorter than the valve body, and internal chambers 58 and 60 are defined adjacent the plugged ends 54 and 56, respectively. Line 42 communicates with chamber 58 and line 44 communicates with chamber 60, such that the pressure differential dP produced by pilot valve 38 acts against opposite ends of fluid metering valve spool 52.

Valve body 50 has a pair of axially spaced annular servo ports 62 and 64 communicating respectively with servo piston/cylinder arrangements 28 and 29 by means of lines 66 and 68 (FIG. 1), respectively. Control fluid is supplied at charge pressure to the metering valve through a line 70 communicating with a charge pressure port 74 (FIG. 3) on the valve spool. Also connected to the fluid metering valve is a tank line 76 in fluid communication with a tank or reservoir 78 at atmospheric pressure. A feedback apparatus 80 according to the present invention is interconnected between fluid metering valve 40 and swashplate 24 and will be described in detail hereinafter.

As shown in FIG. 3, valve spool 52 has a relatively narrow end portion 82 projecting from an annular shoulder 84 formed on the spool at approximately midlength thereof, with narrowed portion 82 terminating in a threaded end 85 near plugged end 56 of the valve. A feedback spring assembly, generally designated 86, is mounted substantially coaxially with the valve spool and sandwiched between shoulder 84 and a retaining nut 88 on threaded spool end 85.

Feedback spring assembly 86 includes an elongated coil spring 90 spaced from the spool and extending along the spool between spring ends 92 and 94. A generally cylindrical housing 96 surrounds spring 90 and extends slightly beyond the ends thereof, with a rigid feedback link 98 projecting laterally from the housing for engagement with swashplate 24, as by means of the link 100 represented schematically in FIG. 1. A spring guide 102 is mounted on the valve spool in abutting relationship with shoulder 84 and is partially interposed between spring end 92 and housing 96. A second spring guide 104 is spaced along the valve spool from spring guide 102 in abutting relationship with retaining nut 88 and is partially interposed between spring end 94 and housing 96.

Spring guide 102 has a cylindrical central sleeve 106 slidably mounted on valve spool 52 with a radially extending integral collar 108 projecting into biased engagement with an inwardly extending flange 110 formed on housing 96. Sleeve 106 is formed with an inner diameter suitable for axial sliding along the valve spool, and an outer diameter sufficiently small to permit the sleeve to be received within an opening in the end 92 of spring 90, such that the spring is seated on the spring guide and engaging an inner face 112 thereof.

Spring guide 104 has a cylindrical central sleeve 114 slidably mounted on valve spool 52 with a radially extending integral collar 116 projecting into biased engagement with an inwardly extending flange 118 formed on housing 96 opposite flange 110. Sleeve 114 seats end 94 of spring 90 and biases spring guide 104 into engagement with retaining nut 88.

The radially extending flanges 110 and 118 on spring guides 102 and 104, respectively, although generally circular in cross sectional profile, each have a plurality of flats 103 (FIG. 5) formed on the periphery thereof which define a cross-section dimension less than the diameter of the circular portion. As will be described below, provision of the relative narrow flats enable the installation of the spring guides within housing 96.

Operation of displacement control 30 and feedback apparatus 80 can be summarized as follows. When it is desired to vary the displacement of pump 12 as by changing the position of swashplate 24, user control 48 is manually actuated to supply an electrical current to first stage pilot valve 38. The pilot valve generates a differential pressure across lines 42 and 44 in linear proportion to the electrical current. When the force developed by the differential pressure exceeds the preload of feedback apparatus 80, as will be understood from the following, fluid metering valve spool 52 is axially displaced within valve body 50 to interconnect charge pressure port 74 with one of servo ports 62 and 64 to energize servo 26 and thereby position swashplate 24.

In order to close the control loop extending between displacement control 30, servo mechanism 26 and swashplate 24, feedback apparatus 80 acts to bias the valve spool toward a steady state fluid metering position within valve body 50. Through feedback links 98 and 100, a change in the position of swashplate 24 as prescribed by servo 26 results in axial shifting of housing 96 within valve 40. To facilitate the following description, it will be presumed that a change in the swashplate position induces a right-to-left shift of housing 96.

As housing 96 is displaced to the left, flange 118 biases spring guide 104 away from retaining nut and against spring end 94. Spring guide 102 is constrained against shoulder 84 on the valve spool and the spring thereby is continually compressed as the housing is displaced relative to valve spool 52. When the force built up within the compressed spring balances the pressure differential acting against the opposite spool ends, the spool and the swashplate assume a steady state position.

It should be understood, of course, that the displacement control works similarly when a commanded change in swashplate position induces a left-to-right displacement of housing 96. As housing 96 is displaced to the right, flange 110 biases spring guide 102 away from shoulder 84 and against spring end 92. Spring guide 104 is constrained against retaining nut 88 and the spring thereby is continually compressed while the housing is displaced relative to valve spool 52. When the force built up within the compressed spring balances the pressure differential acting against the opposite spool ends, the spool and the swashplate assume a steady state position.

Because displacement of housing 96 interacts with valve spool 52 when the feedback force developed within spring 90 reaches a particular value, it can be understood that the initial tension or preload in the spring affects the response characteristics of displacement control 30. As will be shown below, if spring 90 had no preload, the valve spool and swashplate would be overly sensitive to small deviations in the command pressure differential. If spring 90 had an infinitely large preload, no value of differential pressure would have an affect on the spool or the swashplate position.

The relationship of differential pressure dP and swashplate angle is illustrated in FIG. 4. In the upper-right-hand quadrant of the graph, a straight line 97a indicates the linear relationship of swashplate angle with differential pressures below a threshold level "A". For absolute differential pressures less than "A" no swashplate angle is induced. The pilot pressure "A" thus is equivalent to the spring preload, and by varying the preload, the level of differential pressure required to produce any displacement of the swashplate can be prescribed.

Similarly, in the lower-lefthand quadrant of the graph, a straight line 97b indicates the linear relationship of swashplate angle with differential pressures below a threshold level "B". For absolute differential pressures greater than "B" no swashplate angle is induced. The pilot pressure "B" thus is also equivalent to the spring preload, and is consequently equivalent in absolute value to the pressure level "A".

The range of differential pressures over which no swashplate angle is induced, indicated generally by the arrow "C", is referred to as the "deadband" of the displacement control and can be understood to be an offset in the response of the swashplate occurring as a function of the preload of spring 90. By changing the value of the preload, not only the minimum threshold levels of pilot pressure necessary to displace the swashplate, but also the sensitivity of the swashplate to variations in pilot pressure, can be controlled.

Spring preload force is a function of both the inherent stiffness of the spring and the length to which the spring is compressed. For a fixed value of spring compression, therefore, the spring preload force is directly proportional to the spring stiffness. Referring to FIG. 4, it may be understood that the stiffness of the feedback spring 90 is inversely proportional to the slope of lines 97a and 97b. For large values of preload force, and thus spring stiffness, the slope of lines 97a and 97b approach zero and reflect the fact that the swashplate becomes decreasingly responsive to pilot pressure. For very small values of preload force and spring stiffness, lines 97a and 97b become nearly vertical and represent an oversensitivity of the swashplate to small changes in pilot pressure.

The preload of spring 90 is prescribed by selecting a spring of a given length and stiffness, with the interior length of housing 96 establishing the resultant level of spring compression. In other words, based upon the known housing interior axial dimension, when the known spring is placed in the housing interior and captured between the opposite housing ends, the spring is compressed an amount sufficient to develop a predetermined level of force. In order to "fine tune" the amount of spring compression and accurately prescribe the level of preload force developed in the spring, a number of shims or spacers 120 (one shown in FIG. 3) can be inserted between a spring end and the associated spring guide to reduce the interior length of housing 96 and thereby induce additional compression of the spring.

The present invention also envisions a method for assembling feedback apparatus 80 in such a way as to establish a predetermined level of compression, or preload, in spring 90. The simple construction and minimal number of parts provide the capability of reliably selecting a preferred preload.

Initially, with the feedback apparatus unassembled and the various components separate from valve 40, the spring guides 102 and 104 are mounted on opposite spring ends 92 and 94, respectively. The spring and spring guide assembly then is held in an upright orientation with the assembly being supported, arbitrarily, on spring guide 102, and a fixed weight equivalent to the desired spring preload is axially applied to the upper spring guide 104 to compress the spring to a length representative of the desired preloaded condition. While the spring is compressed, the distance between the annular collars 108 and 116 on spring guides 102 and 104, respectively, is measured, to establish the amount of spring compression corresponding to the desired preload force. The fixed load then is removed and the feedback assembly is mounted on the valve spool in the following manner.

With valve spool 52 outside valve body 50, spring guide 102 is inserted through the opening defined by flange 110 in the spring housing 96. Because the spring guide has narrow flats formed on the outer periphery, the spring guide can be tilted slightly away from a direction perpendicular to the housing longitudinal axis and easily fit within the opening in the end of the housing. Spring 90 is then inserted into the housing through the opening defined by housing flange 118 opposite flange 110 and is seated on spring guide 102.

With the spring disposed within housing 96, shim 120 is positioned in the housing and forced against spring end 94 to compress the spring within the housing. The thickness of shim 120 (or the number of shims) is preselected as the difference between the known distance between flanges 110 and 118, and the measured distance between the spring guide collars when the spring was subjected to the fixed weight.

Spring guide 102 then is tilted slightly and inserted through the opening defined by flange 118, with collar 116 interposed between spring end 94 and the housing. It should be understood that shim 120 is formed such that end 94 is permitted to seat on collar 116 of spring guide 104. The spring is thus retained in the housing in a compressed state, with spring guides 102 and 104 outwardly biased against opposite ends of housing 96. Because shim 120 was selected to have a thickness sufficient to compensate for the difference between the measured length of the preloaded spring and the length of the housing, the installed spring is appropriately compressed to have a preload equivalent to the originally applied fixed load.

The threaded end 85 of the valve spool is then inserted through the opposite spring guides 102 and 104 such that the housing assembly is positioned over the narrow portion 82 of the valve spool with spring guide 102 abutting the shoulder 84 formed on the valve spool. Retaining lock nuts 88 are threaded onto end 85 of the valve spool and tightened until the nuts make initial contact with spring guide 104. Overtightening of lock nuts 88 would result in additional compression of the spring 90 and shorten the distance between spring guides 92 and 94, introducing backlash into the assembly by allowing housing 96 to move freely relative to the spring and spring guides. If the nuts 88 are not tightened sufficiently, the feedback assembly would be free to move along the valve spool between stop 84 and the lock nuts. Thus, the capability of assembling the feedback apparatus and the valve spool outside the valve body, such that the lock nuts 88 can be precisely tightened, advantageously provides an antibacklash feature of assembly.

After the lock nuts are satisfactorily tightened and the feedback apparatus is rigidly secured to the valve spool, the valve spool is inserted through end 56 of the valve body and valve body end 56 is sealed with a plug 122. Fedback link 98 is then secured to the housing 96 through an opening 124 formed in the valve body.

This invention thus provides a new and improved spring feedback apparatus for the displacement control of a hydrostatic transmission which can be simply manufactured and provides for the advantageous selection of a specific spring preload.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A feedback apparatus in a displacement control for a variable displacement hydraulic unit having a positionable swashplate, the displacement control including a valve spool axially movable within a valve body, the axial position of the valve spool operating to position the swashplate, the feedback apparatus comprising:
   an elongated housing coupled with the swashplate and slidably mounted on the valve spool, the housing having an axially extending housing interior and spaced apart housing ends;
   a pair of spring guides guided for axial movement and constrained between a pair of spaced stops on the valve spool;
   spring means within the housing interior for biasing the spring guides outwardly into abutting relation with the opposite ends of the housing, the spring means being adapted to apply a predetermined level of preload force for outwardly biasing the spring guides into engagement with the stops on the valve spool such that positioning of the swashplate by the displacement control causes axial movement of the coupled housing along the valve spool to force one of the spring guides against a stop to cause axial movement of the valve spool;
   means for varying the level of preload force developed by the spring;
   each of the housing ends having an opening for receiving the valve spool, the openings in the housing ends defining an inwardly extending flange at each end thereof; each spring guide means comprising a sleeve coaxial with the valve spool and having an outwardly extending collar; and
   the inwardly extending flange at each end of the housing defining an opening therein, the outwardly extending collar on each spring guide engaging the flange to prevent movement of the spring guide through the opening when the spring guide sleeve is coaxially aligned with the valve spool.

2. The feedback apparatus of claim 14 in which the outwardly extending collar on each spring guide includes flats formed thereon to permit movement of the spring guide through the opening in the housing during assembly.

3. In a displacement control for adjusting the position of a swashplate in a variable displacement hydraulic unit, the displacement control having a fluid metering valve including a valve spool axially moveable within a valve body, the axial position of the valve spool operating to position the swashplate, a feedback apparatus constrained between spaced apart stops on the valve spool and comprising:
   an elongated housing coupled with the swashplate and guided for axial movement along the valve spool, the housing having opposite ends with an opening formed therein for receiving the valve spool;
   a spring mounted concentric with the valve spool and disposed between the opposite housing ends, the spring having a predetermined length whereby positioning of the spring within the housing generates a preload force against the opposite housing ends;
   a pair of spring guides slidably mounted on the valve spool between the opposite ends of the spring and the opposite housing ends and associated one each with a stop on the valve spool, the stops begin positioned on the valve spool such that positioning of the swashplate by the displacement control causes axial movement of the coupled housing along the valve spool to force one of the spring guides against the stop to cause axial movement of the valve spool.

4. The feedback apparatus of claim 3 including means for varying the level of preload force generated when the spring is captured between the opposite housing ends.

5. A method for interconnecting a positionable swashplate in a variable displacement hydraulic unit with a swashplate displacement control by means of a feedback spring having a predetermined preload, the method including the steps of:
   providing a feedback spring having two spaced ends;
   applying a fixed load representative of the predetermined preload to the spring, whereby application of the fixed load causes axial deflection of the spring;
   measuring the distance between the two ends of the spring when the spring is deflected under the fixed load, the fixed load being removed after the measurement;
   providing an elongated housing having spaced apart ends, the housing ends being spaced apart a known distance;
   providing a first spring guide in the housing, with the spring guide seated at one end of the housing;
   providing a removable insert between the first spring guide and an adjacent end of the spring, the insert having a thickness representative of the difference between the measured distance between the two ends of the spring when the spring is deflected and the distance between the spaced apart housing ends;
   compressing the spring in the housing;
   providing a second spring guide in the housing to retain the spring therewithin in a compressed state.

6. The method of claim 5 comprising the further step of providing a sleeve on said spring guide which has an outwardly extending collar which is adapted to permit movement of the spring guide through an opening in said housing.

* * * * *

UNITED STATES PATENT AND TRADEMARK OFFICE
CERTIFICATE OF CORRECTION

PATENT NO. : 5,160,245
DATED : November 3, 1991
INVENTOR(S) : Kerry Geringer

It is certified that error appears in the above-identified patent and that said Letters Patent is hereby corrected as shown below:

Title Page, "[73]" should be shown as follows:

- [73] Assignee: Sauer Inc., Ames, Iowa -

Signed and Sealed this

Third Day of July, 2001

*Attest:*

*Attesting Officer*

NICHOLAS P. GODICI
*Acting Director of the United States Patent and Trademark Office*